United States Patent [19]

Purves et al.

[11] Patent Number: 4,524,085

[45] Date of Patent: Jun. 18, 1985

[54] LECITHIN CONTAINING COOKING FATS WITH REDUCED THERMAL DISCOLORATION

[75] Inventors: Edward R. Purves; Robert F. Thomas, both of Cincinnati, Ohio

[73] Assignee: The Procter & Gamble Company, Cincinnati, Ohio

[21] Appl. No.: 551,391

[22] Filed: Nov. 14, 1983

[51] Int. Cl.³ .......................... A23D 5/00; A23D 5/02
[52] U.S. Cl. .................................. 426/601; 426/607; 426/609; 426/662; 426/811
[58] Field of Search .............. 426/609, 607, 811, 662, 426/601

[56] References Cited

U.S. PATENT DOCUMENTS

| | | | |
|---|---|---|---|
| 2,280,427 | 4/1942 | Thurman | 426/662 X |
| 2,555,972 | 6/1951 | Karjala et al. | 426/662 |
| 2,970,910 | 2/1961 | Thurman | 426/662 |
| 3,357,918 | 12/1967 | Davis | |
| 3,443,966 | 5/1969 | Reid | |
| 3,896,975 | 7/1975 | Follmer | |
| 4,096,258 | 6/1978 | Hanson | |
| 4,166,823 | 9/1979 | Sietz | 426/662 X |

FOREIGN PATENT DOCUMENTS

| | | |
|---|---|---|
| 107530 | 8/1979 | Japan . |
| 110210 | 8/1979 | Japan . |
| 112825 | 9/1979 | Japan . |
| 124009 | 9/1979 | Japan . |
| 126206 | 10/1979 | Japan . |
| 127408 | 10/1979 | Japan . |
| 127907 | 10/1979 | Japan . |
| 54400 | 4/1980 | Japan . |
| 1229430 | 4/1971 | United Kingdom .......... 426/662 |
| 2084606 | 4/1982 | United Kingdom . |
| 642316 | 1/1979 | U.S.S.R. . |

OTHER PUBLICATIONS

Andres, C., Ed., "Heat Stable Lecithin", Food Processing, pp. 68–69, Nov. 1983.
Bailey's Industrial Oil and Fat Products, D. Swern, ed., 3rd ed., Interscience Pub., N.Y. (1964), pp. 29–30, 41, 78, 291–293, 311, 381, 469, 731–735.

Primary Examiner—Robert Yoncoskie
Attorney, Agent, or Firm—Nancy S. Mayer; Rose Ann Dabek; Richard C. Witte

[57] ABSTRACT

Cooking fat compositions containing pretreated lecithin which resist thermal darkening are disclosed. The pretreatment, which comprises the addition of water to lecithin dissolved in a minimal amount of fat followed by heating and filtration, results in a decrease in the thermal discoloration of lecithin with no substantial reduction in its anti-sticking properties. This enables the use of lecithin at levels in fats higher than for untreated lecithin to improve the anti-sticking performance of the fat.

22 Claims, No Drawings

LECITHIN CONTAINING COOKING FATS WITH REDUCED THERMAL DISCOLORATION

TECHNICAL FIELD

The present application relates to cooking fats, in particular to fat compositions containing lecithin which resist exessive thermal darkening upon heating. A process for the preparation of the cooking fats requires pretreatment of the lecithin diluted in fat with water and filtration.

BACKGROUND OF THE INVENTION

Lecithin is commonly added to cooking fats as an anti-sticking agent, but has the disadvantage that it darkens in color at high temperatures, thereby limiting the level which can be used. Foodservice establishments are often required to hold a heated fat for extended periods of time. Fats containing a higher than normal level of lecithin to enhance the anti-sticking properties darken more quickly when subjected to continuous heating. Associated with this discoloration is generation of an off-flavor. The increased darkening and generation of off-flavor render such fats unacceptable. An effective means of preventing the darkening of lecithin at high temperatures is desirable and would permit its use at increased levels in fats to improve their anti-sticking performance.

Fat or oil additives known for inhibiting darkening of phospholipids, such as lecithin, upon heating are primarily acidic or weakly basic compounds such as amino acid salts, carboxylic acids and derivatives, or salts of carbonates or bicarbonates. Inhibition of discoloration of phospholipids in fatty oils during heating can be achieved by the addition to the oil of a mixture of an acidic amino acid salt and a basic amino acid salt chosen from salts of arginine and glutamic acid, lysine and glutamic acid, or lysine and aspartic acid. In addition, sodium glutaminate, acetic anhydride or alkali metal acetate can be employed.

Restraint of phospholipid coloration upon heating also results from the addition of sodium succinate, or succinic acid to the fat. Japan Pat. No. 127,907, issued Oct. 4, 1979, discloses a vegetable cooking oil composition containing succinic acid or sodium succinate to prevent browning of phosphatides and spattering upon heating at greater than 150° C. (302° F.) The oil is prepared by adding to the base oil a minimum of 0.5% by weight phosphatide, a minimum of 1% by weight succinic acid or sodium succinate, and an optional oleophilic surfactant. After heating and stirring, insolubles are removed by filtration and more vegetable oil is added to adjust the phosphatide concentration to 0.5 to 5% by weight. The effects of the additives or the filtration on the anti-sticking properties of the fat are not disclosed.

Carbon dioxide-generating compounds also inhibit thermal darkening of fats containing phospholipids. Japan Pat. No. 110,210 of Matsueda et al., issued Aug. 29, 1979, discloses a barbecue oil composition containing vegetable oil, a phosphatide, and a compound that generates carbon dioxide upon heating. The latter inhibits spattering and coloration upon heating of the barbecue composition. The carbon dioxide-generating compound comprises the carbonates of potassium, ammonia, and magnesium, and bicarbonates of ammonia and sodium, added to the fat and lecithin mixture at a minimum level of 5% by weight, preferably 20% by weight, of the phospholipid. The oil is prepared by adding the carbon dioxide-generating compound to a 10% by weight solution of phosphatide in oil, heating to greater than 80° C. (176° F.), filtering, and dissolving in the vegetable oil. The anti-sticking properties of the oil composition are not discussed.

Pretreatment of lecithin to prevent thermal browning in heated fat compositions is taught by Japan Pat. No. 54,400, issued Apr. 21, 1980. The pretreatment comprises heating the lecithin in an inert atmosphere, either alone or diluted with a fat, at 150° C. to 230° C. (302° F. to 446° F.) for five minutes to one hour.

It has now been found that lecithin which has been pretreated in a small amount of fat with water and filtration resists excessive thermal darkening in heated fat compositions. Excessive discoloration of fats containing the filtrate when heated is decreased because much of the lecithin is removed by the filtration step. Surprisingly, the anti-sticking properties of a fat containing the filtrate are not substantially reduced compared to those of a fat containing untreated lecithin. Due to the reduction in thermal darkening, higher levels of pretreated lecithin can be employed to overcome any minor decrease in anti-sticking properties and provide fat compositions with improved anti-sticking effectiveness. Therefore, use of the organic acids, salt additives, or carbonate compounds of the Japanese patents can be avoided. Any adverse effect these may have on the taste or storage stability of the fat are prevented as well as any negative connotations associated with listing additives such as these on the label of a treated fat product.

Accordingly, it is an object of this invention to provide novel fat compositions which resist thermal darkening.

It is a further object of this invention to provide novel fat compositions with improved anti-sticking properties.

it is a further object of this invention to provide a process for the pretreatment of lecithin that will aid in decreasing its thermal discoloration in heated fats without substantially impairing its anti-sticking properties.

It is a further object of this invention to provide a process for the pretreatment of lecithin that will permit its use at increased levels in grilling fats to improve their anti-sticking effectiveness.

These and other objects of the invention will be evident from the following disclosure. All percentages are by weight unless otherwise indicated.

DISCLOSURE OF THE INVENTION

A new and improved fat composition which is resistant to thermal darkening when heated has been discovered comprising a major amount of an edible fluid fat, and pretreated lecithin. The composition typically has a kettle browning test spectrophotometric absorbance of less than 0.1 at 4 hours. The fat comprises primarily triglycerides having saturated or unsaturated $C_{12}$ to $C_{22}$ fatty acid moieties, preferably containing a suspension of particulate triglyceride hardstock. The pretreated lecithin is present in an amount of at least 0.1% by weight of the fat calculated prior to filtration.

Additionally, this invention comprises a method for the pretreatment of lecithin in fat to prevent excessive thermal darkening of a cooking fat containing lecithin when the fat is heated for an extended time period. More specifically, the process comprises pretreating lecithin dissolved in a minimal amount of fat by adding water, heating and filtering the mixture, followed by adding the filtrate to a cooking fat. Thermal darkening of lecithin is retarded with no substantial reduction in its anti-sticking properties. The pretreated lecithin can therefore be added to the fat at a higher level to improve anti-sticking performance. This invention is especially useful for improving the anti-sticking performance of grilling fats.

DESCRIPTION OF PREFERRED EMBODIMENTS

The invention comprises fat compositions containing lecithin which resist thermal darkening when heated, and a method for the pretreatment of lecithin which prevents excessive darkening of fats containing lecithin when heated with no substantial reduction in anti-sticking properties. Treatment of lecithin diluted in fat with water, heating, and filtration retards thermal darkening of a fat to which the filtrate is added as an anti-sticking agent, thereby enabling use of high levels of filtrate to improve fat anti-sticking performance.

All lecithin levels as a percent by weight of the fat are defined herein on a prefiltration basis. The filtration step is known to remove a portion of the lecithin. To facilitate easy comparison of unfiltered or untreated lecithin with the filtered or treated lecithin, the levels are designated as if no lecithin were removed by the filtering step.

The fat composition of the present invention comprises a major amount of an edible fluid fat and lecithin pretreated by diluting in fat, adding water, heating, and filtering in an amount of at least about 0.1% by weight of the fat. The composition typically has a kettle browning test spectrophotometric absorbance of less than 0.1 at 4 hours. Preferably the fat composition comprises a major amount of an edible fluid fat, and lecithin pretreated by diluting in a minimal amount of fat, adding water, heating, and filtering in an amount of at least about 0.3% by weight of the fat. The composition contains no major amounts of additives that render it unsuitable for frying or grilling.

Fats suitable for use in the present invention include all edible fats or oils which are solid, plastic, liquid, or fluid, i.e., pourable or fluid when heated to temperatures normally encountered in cooking operations of from about 200° F. (93° C.) to about 500° F. (260° C.). The fats typically comprise triglycerides having $C_{12}$ to $C_{22}$ fatty acid moieties. These materials can be derived from plants or animals or can be edible synthetic fats or oils. Animal fats such as lard, tallow, oleo oil, oleo stock, oleo stearin, and the like, can be used. Also, liquid oils, such as unsaturated vegetable oils, or liquid oils converted into plastic fats by partial hydrogenation of the unsaturated double bonds of the fatty acid constituents, or by proper mixture with a sufficient amount of solid triglycerides are suitable.

Preferred fats are fluid fats having a sufficiently low content of triglycerides of melting point higher than about 60° F. (16° C.), as to provide upon cooling of the composition from about 100° F. (38° C.) to about 60° F. (16° C.) an increase in the amount of solids of not more than about 20%. Such fats are fully pourable at room temperatures. Liquid glycerides useful herein comprise primarily triglycerides having $C_{12}$ to $C_{22}$ fatty acid moieties which can be saturated or unsaturated. They can be derived from any of the naturally occurring glyceride oils such as soybean oil, cottonseed oil, peanut oil, rapeseed oil, sesame seed oil, sunflower seed oil, and the like. Also suitable are liquid oil fractions obtained from palm oil, lard, and tallow, as for example by graining or directed interesterification followed by separation of the oil.

The fluid fat preferably includes triglycerides having acyl groups predominantly in the range of from 16 to 22 carbon atoms and having a polyunsaturated character. Preferred polyunsaturated triglycerides include those derived from soybean, cottonseed, peanut, safflower, and sunflower seed. The preferred fluid fat contains a suspension of a triglyceride hardstock constituent in particulate form. The hardstock constituent usually amounts to from about 0.5% to about 15% by weight of the fat, preferably from about 2% to about 5% by weight. The hardstock constituent comprises substantially fully hydrogenated normally solid fatty triglyceride, and optionally a normally solid fatty emulsifier. The hardstock constituent ordinarily has an iodine value of less than about 15, preferably it has an iodine value ranging from about 1 to about 12. The normally solid fatty triglycerides in the hardstock constituent ordinarily contain in each of their fatty acid moieties from 12 to 22 carbon atoms. The hardstock normally has a particle size in the range from about 3 to about 100 microns to allow the fat to have a stable liquid or fluid state.

Various additives can be used in the cooking fats of this invention consistent with the ultimate end use, which primarily comprises various types of frying or griddling. The compositions of this invention can normally contain optional amounts of flavorings, emulsifiers, anti-spattering agents, anti-foaming agents and the like. Any adverse effects on fat color due to the additives can possibly be negated or compensated for by partial or total encapsulation of the additive.

Lecithin suitable for use in the present invention includes most commercially available lecithins, such as powdered and granular lecithin, hydroxylated lecithin, and natural lecithin. Lecithin can be derived from a variety of animal and vegetable sources. Suitable vegetable lecithins can be derived from soybean oil, ground nut oil, cottonseed oil, and corn oil. Lecithin derived from soybean oil is preferred. The term lecithin as used herein is defined as commercial lecithin, typically containing about 60% of three major phospholipids, i.e., phosphatidyl choline, phosphatidyl ethanolamine, and phosphatidyl inositide, about 11% of other phosphatides, about 5% to 7% oligosaccharides, and about 33% to 35% oil.

The amount of lecithin included in cooking fats as an antisticking agent is presently limited by thermal darkening at cooking temperatures. Lecithin at a level of about 0.3% or higher by weight can cause noticeable darkening of the fat when heated. Therefore, lecithin is commonly included in an amount of from about 0.1% to about 0.3% by weight. The present invention permits its inclusion at levels of 0.1% by weight or higher. Because thermal darkening is prevented or significantly retarded, pretreated lecithin can be added to the compositions of the present invention at higher levels than untreated lecithin. Preferably, the lecithin is added to the fat compositions in an amount of about 0.3% or higher by weight of the fat. Levels substantially higher than about 1% can be employed in this invention if economically feasible.

Any suitable water can be used in the present invention. Distilled water is preferred. It is desirable to minimize the amount of water used so that the final fat composition is not greatly diluted. Preferably, water in an amount of from about 5% to about 65% by weight of the lecithin, and most preferably from about 5% to about 50% by weight of the lecithin is used in the lecithin pretreatment.

The process of the present invention decreases thermal discoloration without substantially reducing the anti-sticking properties of cooking fats containing lecithin. The process of the present invention comprises pretreating lecithin diluted with a minimal amount of fat by adding water, heating, and filtering the mixture, followed by adding the filtrate to a cooking fat.

In the pretreatment process for the lecithin, the water is typically added to lecithin previously mixed with a small amount of the fat. The lecithin is diluted with fat such that the lecithin is from about 5% to about 85%, preferably from about 5% to about 25%, by weight of the lecithin/fat mixture. Water is added in an amount such that it constitutes from about 5% to about 65% by weight of the lecithin, preferably from about 5% to about 50% by weight of the lecithin. The mixture is heated to a temperature of from about 130° F. (54° C.) to about 170° F. (77° C.) with mixing. The mixture is filtered hot. The filtrate is then added to the cooking fat in an amount sufficient to provide a lecithin level of at least about 0.1% by weight of the fat had none been removed by the filtering, preferably at least about 0.3% or higher by weight of the fat. Discoloration of the fat in use is decreased, permitting use of higher levels of the filtrate than could be used for untreated lecithin.

The water can also be added in the form of an acidic or basic solution as a pH adjustment. It may be desirable to adjust the pH to an optimum value for specific processing conditions, or to adjust to an optimum product pH which has been changed due to additives. The mixture is then heated and filtered as previously described, and the filtrate added to the cooking fat.

Much of the lecithin is removed by the filtration, thereby reducing color development. However, the anti-sticking properties of the filtrate are not substantially reduced compared to untreated lecithin. Fractionation of lecithin and testing of the following phosphatide components: (1) cephalin, (2) choline, (3) inositide, and also testing of lecithin with only saccharides removed, has shown that both cephalin and the oligosaccharides contribute to thermal discoloration, but only cephalin contributes to anti-sticking. Cooking fats containing a higher level of filtrate than that normally used for untreated lecithin have enhanced anti-sticking properties.

It can be appreciated that still other executions of this invention can be devised without departing from its scope and spirit and without losing its advantages. Minor processing steps can be added or subtracted, temperatures altered slightly, or the sequence of some steps interchanged without departing from the scope of the invention. In particular, pretreating lecithin in fat with water, heating, and filtration, however practiced, results in prevention of or significant decreases in thermal darkening of fats containing lecithin with no substantial reduction in their anti-sticking properties. This permits use of increased amounts of pretreated lecithin in fats to enhance their anti-sticking function.

Kettle Browning Test Method

Comparison of fat composition discoloration in all compositions was via a standard kettle browning test method. A kettle was filled with liquid oil at a specified level, heated, and maintained at 350° F. (177° C.) Four hundred grams of the composition to be tested were placed into each of four beakers. The beakers were placed in a rack on top of the kettle in a manner such that they were predominantly immersed in the oil contained within the kettle. A thermometer was placed in each beaker. The compositions were heated to 340° F. (171° C.) The compositions were then sampled and absorbance measured for each using a spectrophotometer. Reference compositions were tested in the same manner. Reference samples comprised the fat composition being tested with no lecithin component or with an untreated lecithin component present at the same concentration as in the test sample. Absorbance readings for each test and reference composition were obtained on a Varian Series 634 U.V.—Visible Spectrophotometer set at a wavelength of 534 nm. at periodic time intervals after continuous heating of the samples. Test samples containing solids resulted in inaccurate absorbance readings. When this occurred, samples were heated to a higher temperature to dissolve the solids, or alternatively, samples and reference compositions were filtered and reheated prior to measuring their absorbance.

Pan-Sticking Test

A pan-sticking test was employed to determine the anti-sticking performance of fats when used for pan frying. The fat to be tested was first heated to 125° F. (52° C.) in a constant temperature bath. A gas stove equipped with a gas flow meter was employed. After lighting the flame the gas flow was adjusted to 3.5 standard cubic per hour. Eggs were warmed to room temperature and cracked into 400 ml. beakers, one egg per beaker. The frying pan was seasoned by placing 400 g. of fat into the pan and heating on the stove for ten minutes. The fat was then discarded and the pan wiped with a paper towel. The pan was returned to the flame and preheated to 400° F. (204° C.) The pan interior was then coated quickly with 2 cc. of the fat. The egg was added and cooked for 1 minute and 10 seconds. The pan was removed from the flame and tilted at a 90° angle to grade sticking performance according to the following scale. The test was then repeated 10 times for each fat sample beginning at the point of preheating the pan to 400° F. (204° C.)

| Pan Sticking Test Grading Scale | | |
|---|---|---|
| Grade | % Sticking | Amount of Force |
| 10 | 0 | Tilt of the pan |
| 9 | 1–5 | Tilt of the pan |
| 8 | 6–10 | Tilt of the pan |
| 9 | 0 | Two shakes with the pan at 90° |
| 8 | 1–5 | Two shakes with the pan at 90° |
| 7 | 6–10 | Two shakes with the pan at 90° |
| 6 | 11–20 | Two shakes with the pan at 90° |
| 8 | 0 | Pan upside down for 5 sec. |
| 7 | 1–5 | Pan upside down for 5 sec. |
| 6 | 5–10 | Pan upside down for 5 sec. |
| 7 | 1–5 | Stuck surface must be loosened with a spatula |
| 6 | 5–10 | Stuck surface must be loosened with a spatula |
| 5 | 11–20 | Stuck surface must be loosened with a spatula |
| 4 | 21–30 | Stuck surface must be loosened with a spatula |
| 3 | 31–50 | Stuck surface must be loosened with a spatula |
| 2 | 51–75 | Stuck surface must be loosened with a spatula |
| 1 | 76–100 | Stuck surface must be |

-continued

| Grade | Pan Sticking Test Grading Scale | |
|---|---|---|
| | % Sticking | Amount of Force |
| | | loosened with a spatula |

The following embodiments illustrate the practice of this invention, but are not intended to limit it.

EXAMPLE 1

Example 1 illustrates that filtration of lecithin decreases thermal darkening when used in a cooking fat without substantially reducing its anti-sticking performance.

Five different amounts of commercial lecithin (18 g., 27 g., 36 g., 90 g. and 180 g.) were mixed into small amounts of a fluid vegetable oil shortening (197 g., 188 g., 179 g., 125 g., 35 g.) containing equivalent trace amounts of coconut oil carotene. The shortening comprised primarily triglycerides having $C_{12}$ to $C_{22}$ fatty acid moieties and contained from about 0.5% to about 15% by weight of a suspension of triglyceride hardstock in particulate form. A sample of the shortening with no lecithin added was employed as a reference. Each sample was heated to about 150° F. (66° C.) Water was added with stirring to the samples in the amounts equal to 58% by weight of the lecithin. The samples were heated in a 150° F. (66° C.) oven for 30 to 45 minutes. Half of each sample was filtered. A portion of each of the resulting samples were combined with a large amount of the fluid vegetable shortening with added flavorings to prepare samples containing 0.4%, 0.6%, 0.8%, 2.0% and 4.0% by weight of lecithin on an unfiltered basis, respectively. The samples and a commercially available fat containing 0.125% lecithin were subjected to the kettle browning test previously described at 340° F. (171° C.) with absorbance readings taken after 4 hours. The resulting data are summarized in Table I. All of the filtered samples, the unfiltered samples containing 0.4%, 2.0% and 4.0% lecithin, and the commercial fat were subjected to the pan sticking test previously described and results are listed in Table I.

A lower absorbance indicates less color intensity in the sample, i.e., more light is transmitted through the sample. The data demonstrate that the filtered samples were much lower in color intensity than the corresponding unfiltered samples. The sticking grade was reduced by the filtering step but not by a substantial amount. Typically commercial grilling fats have a color absorbance above about 0.1 and a sticking grade range of about 8.2 to 8.5. Thus, even though the filtering step slightly reduces anti-sticking, the large reduction in thermal discoloration permits use of higher lecithin level which offset this slight reduction in anti-sticking and even improve anti-sticking performance.

TABLE I

| Fat Sample | Absorbance 4 Hrs. | Sticking Grade | Number of Sticking Tests |
|---|---|---|---|
| 0% lecithin | .020 | 6.2 | 20 |
| Commercial fat 0.125% unfiltered lecithin | .112 | 8.2 | 10 |
| 0.4% unfiltered lecithin | .635 | 9.6 | 10 |
| 2.0% unfiltered lecithin | 1.896 | 10 | 10 |
| 4.0% unfiltered lecithin | (off scale) | 10 | 10 |
| 0.4% filtered lecithin | .018 | 8.0 | 10 |
| 0.6% filtered lecithin | .013 | 8.4 | 10 |
| 0.8% filtered lecithin | .017 | 9.0 | 10 |
| 2.0% filtered lecithin | .059 | 7.8 | 10 |
| 4.0% filtered lecithin | 1.480 | 10 | 10 |

EXAMPLE 2

Example 2 illustrates that use of distilled water in lecithin pretreatment results in less thermal discoloration than use of tap water.

The experiment of Example 1 was repeated for the 0.4% lecithin sample. Two samples of 16 g. of lecithin were each added to 184 g. of the fat of Example 1. Then 2 g. of distilled water or tap water were added and the mixture heated to 150° F. (66° C.) prior to filtration. The added water was 12.5% by weight of the lecithin. The samples were filtered while hot and diluted with the same fat with added flavorings to prepare samples containing 0.4% lecithin on an unfiltered basis. The samples were subjected to the kettle browning test previously described at 340° F. (171° C.) The resulting data are summarized in Table II.

TABLE II

| Fat Sample | Absorbance, 4 HRs |
|---|---|
| Prepared using distilled water | .038 |
| Prepared using tap water | .167 |

EXAMPLE 3

Example 3 illustrates that the pretreatment filtering of lecithin with pH adjustment does not substantially reduce the anti-sticking performance of the lecithin in fat. Thus, the water can be added as part of an acidic or basic solution used to adjust the pH for optional processing or product conditions.

Several fat samples containing 0.4% lecithin by weight were treated in a manner similar to Example 1 except that small amounts of acid or base were added instead of water to the lecithin/fat mixture to adjust the pH prior to heating. Half of the samples were filtered while hot. Both filtered and unfiltered samples were diluted with the same type of fat as in Example 1 and subjected to the kettle browning and pan-sticking test previously described. The results are listed in Table III. All filtered samples had low absorbance readings indicating a reduction in thermal discoloration. Averaging sticking grades from a greater number of test resulted in smaller differences between filtered and unfiltered samples.

TABLE III

| Fat Sample | Absorbance 4 Hrs. | Sticking Grade | Number of Sticking Tests |
|---|---|---|---|
| 0.4% unfiltered lecithin | .211 | 8.6 | 10 |
| | .174 | 8.0 | 10 |
| | .155 | 8.5 | 10 |

TABLE III-continued

| Fat Sample | Absorbance 4 Hrs. | | Sticking Grade | | Number of Sticking Tests |
|---|---|---|---|---|---|
| 0.4% filtered lecithin | | .487 | | 8.7 | 10 |
| | | .428 | | 8.4 | 10 |
| | Avg. | .291 | Avg. | 8.4 | |
| | | .034 | | 8.3 | 10 |
| | | .071 | | 8.8 | 10 |
| | | .061 | | 8.7 | 10 |
| | | .065 | | 8.4 | 10 |
| | | .091 | | 6.8 | 10 |
| | Avg. | .064 | Avg. | 8.2 | |

What is claimed is:

1. A process for the preparation of a cooking fat composition comprising:
   (a) pretreating lecithin by diluting with fat to form a mixture such that the lecithin is in an amount of about 5% to about 85% by weight of the mixture, adding water in an amount of at least about 5% by weight of the lecithin, heating to at least about 130° F. (54° C.) to 170° F. (77° C.), and filtering the mixture to remove excess lecithin; and
   (b) adding the filtrate to a cooking fat in amounts to provide sufficient lecithin to improve the anti-sticking properties of said composition;
   wherein thermal discoloration of the fat is decreased compared to a fat containing the same level of untreated lecithin without substantially reducing the anti-sticking properties of the fat.

2. The process of claim 1 wherein the cooking fat composition has a kettle browning test spectrophotometric absorbance of less than about 0.1 at 4 hours.

3. The process of claim 1 wherein the fat comprises triglycerides having saturated or unsaturated $C_{12}$ to $C_{22}$ fatty acid moieties.

4. The process of claim 3 wherein the fat contains from about 0.5% to about 15% by weight of a suspension of triglyceride hardstock constituent in particulate form.

5. The process of claim 3 wherein the lecithin comprises soybean lecithin.

6. The process of claim 3 wherein the water comprises distilled water.

7. The process of claim 3 wherein the lecithin is diluted with fat such that the lecithin is from about 5% to about 25% by weight of the lecithin/fat mixture.

8. The process of claim 3 wherein from about 5% to about 65% water by weight of the lecithin is added to the lecithin diluted with fat.

9. The process of claim 8 wherein from about 15% to about 50% water by weight of the lecithin is added to the lecithin diluted with fat.

10. The process of claim 8 wherein the water is added as part of an acidic or basic solution to the lecithin/fat mixture prior to heating and filtration.

11. The process of claim 8 wherein the lecithin is filtered while hot.

12. A fat prepared according to claim 1.

13. A fat prepared according to claim 2.

14. A cooking fat composition comprising:
    (a) a major amount of an edible fluid fat; and
    (b) pretreated lecithin in an amount sufficient to improve the anti-sticking properties of said composition
    wherein the lecithin is pretreated by diluting with a fat to form a mixture such that the lecithin is in an amount of about 5% to about 85% by weight of the mixture, adding water in an amount of at least about 5% by weight of the lecithin, heating to at least about 130° F. (54° C.) to about 170° F. (77° C.), filtering said mixture to remove excess lecithin, and adding the filtrate to the fluid fat to form the cooking fat wherein thermal discoloration of the fat is decreased compared to a fat containing the same level of untreated lecithin without substantially reducing the anti-sticking properties of the fat.

15. The composition of claim 14 having a kettle browning test spectrophotometric absorbance at 4 hours of less than 0.1.

16. The composition of claim 14 wherein the fat comprises triglycerides having saturated or unsaturated $C_{12}$ to $C_{22}$ fatty acid moieties.

17. The composition of claim 16 wherein the fat contains from about 0.5% to about 15% by weight of a suspension of triglyceride hardstock constituent in particulate form.

18. The composition of claim 16 wherein the lecithin comprises soybean lecithin.

19. The composition of claim 16 wherein the water comprises distilled water.

20. The composition of claim 16 wherein the lecithin is pretreated with water in an amount of from about 5% to about 65% by weight of the lecithin.

21. The composition of claim 20 wherein the lecithin is pretreated with water in an amount of from about 5% to about 50% by weight of the lecithin.

22. The composition of claim 20 wherein the water is added as an acidic or basic solution to the lecithin/fat mixture prior to heating and filtration.

* * * * *